United States Patent
Meggison et al.

(10) Patent No.: US 7,203,168 B1
(45) Date of Patent: Apr. 10, 2007

(54) SYSTEM AND METHOD FOR MANAGING NETWORK ELEMENTS IN AN ATM NETWORK

(75) Inventors: Earl C. Meggison, Lilburn, GA (US); Randy S. Young, Lilburn, GA (US); David Rutland, Cumming, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 1037 days.

(21) Appl. No.: 10/173,594

(22) Filed: Jun. 19, 2002

(51) Int. Cl.
*H04L 12/26* (2006.01)
*H04L 12/28* (2006.01)

(52) U.S. Cl. .................... 370/231; 370/235; 370/395.1

(58) Field of Classification Search .............. 370/229, 370/230, 235, 389, 395.1, 231, 395.21
See application file for complete search history.

(56) References Cited

U.S. PATENT DOCUMENTS

| | | | | |
|---|---|---|---|---|
| 6,085,238 A | * | 7/2000 | Yuasa et al. | 709/223 |
| 6,889,377 B1 | * | 5/2005 | Gasthaus et al. | 718/105 |
| 6,891,795 B1 | * | 5/2005 | Hamachi et al. | 370/227 |
| 6,990,518 B1 | * | 1/2006 | Secer | 709/223 |
| 2004/0202159 A1 | * | 10/2004 | Matsubara et al. | 370/389 |

* cited by examiner

*Primary Examiner*—Chau Nguyen
*Assistant Examiner*—Marcus R. Smith
(74) *Attorney, Agent, or Firm*—Withers & Keys, LLC

(57) ABSTRACT

Reporting tools used to manage an asynchronous transfer mode (ATM) network. Tools include a trunk inventory reporting tool, a trunk utilization reporting tool, an exceptions reporting tool and a flow control processor activation utility. Reports generated by these the tools include information about the operation and capacity of trunks, switches and user network interfaces.

3 Claims, 8 Drawing Sheets

| FIELD NAME | SOURCE | DESCRIPTION |
|---|---|---|
| A-END NO. OF VCs | EMS | THE NUMBER OF VIRTUAL CIRCUITS GOING TO OR THROUGH A PARTICULAR LOGICAL PORT |
| A-END CAC | SNMP | ATM CALL ADMIN CONTROL |
| A-END CBR BANDWIDTH ALLOCATED | EMS | CONSTANT BIT RATE (CBR) BANDWIDTH ALLOCATION FOR ATM LPORT |
| A-END VBR-RT BANDWIDTH ALLOCATED | EMS | VARIABLE BIT RATE (VBR) REAL TIME BANDWIDTH ALLOCATION FOR ATM LOGICAL PORT |
| A-END VBR-NRT BANDWIDTH ALLOCATED | EMS | VARIABLE BIT RATE (VBR) NON-REAL TIME BANDWIDTH ALLOCATION FOR ATM LOGICAL PORT |
| A-END UBR BANDWIDTH ALLOCATED | EMS | UNSPECIFIED BIT RATE (UBR) BANDWIDTH ALLOCATION FOR ATM LOGICAL PORT |
| A-END CBR OVERSUBSCRIPTION | EMS | CONSTANT BIT RATE (CBR) BANDWIDTH OVERSUBSCRIPTION |
| A-END VBR-RT OVERSUBSCRIPTION | EMS | VARIABLE BIT RATE (VBR) REAL TIME BANDWIDTH OVERSUBSCRIPTION |
| A-END VBR-NRT OVERSUBSCRIPTION | EMS | VARIABLE BIT RATE (VBR) NON-REAL TIME BANDWIDTH OVERSUBSCRIPTION |
| A-END UBR OVERSUBSCRIPTION | EMS | UNSPECIFIED BIT RATE (UBR) BANDWIDTH OVERSUBSCRIPTION |

FIG. 3A

| FIELD NAME | SOURCE | DESCRIPTION |
|---|---|---|
| TRUNK NAME | EMS | TRUNK NAME |
| BANDWIDTH | EMS | BANDWIDTH OF THE TRUNK |
| SUBSCRIPTION FACTOR | EMS | PERCENTAGE OF OVERSUBSCRIPTION ALLOWED |
| VPN NAME | EMS | VPN NAME TO WHICH THE TRUNK BELONGS |
| TRAFFIC TYPE | EMS | TYPE OF TRAFFIC ALLOWED OVER CASCADE TRUNK |
| ADMIN COST | EMS | ADMINISTRATIVE COST OF THE TRUNK |
| TRUNK STATUS | SNMP | CURRENT STATE OF THE TRUNK |

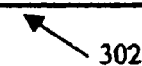

FIG. 3B

| FIELD NAME | SOURCE | DESCRIPTION |
|---|---|---|
| REROUTE DELAY | EMS | REPRESENTS THE RATE (IN SECONDS) AT WHICH EACH CARD POLLS THE VIRTUAL CIRCUITS FOR A BETTER ROUTE |
| REROUTE COUNT | EMS | THE NUMBER OF CIRCUITS THAT CAN ISSUE REROUTE REQUESTS IN A SINGLE BATCH |

FIG. 3C

| EXCEPTION | THRESHOLD CRITERIA | DATA FIELDS |
|---|---|---|
| VCs PER PPORT | XXXX FLOW-CONTROLLED VIRTUAL CIRCUITS PER DEFINED SERVICE RATE PHYSICAL PORT | SWITCH NAME; SWITCH IP ADDRESS, SLOT NO.; CARD TYPE; PHYSICAL PORT ID; NO. OF FLOW CONTROLLED VIRTUAL CIRCUITS; BASED ON DEFINED SERVICE RATES, SUCH AS DS-3, OC-3, AND OC-12 [THESE SERVICE RATES ARE INDUSTRY STANDARD TERMS] |
| VCs PER CARD | XXX VIRTUAL CIRCUITS PER CARD | SWITCH NAME; SWITCH IP ADDRESS, SLOT NO.; CARD TYPE; NO. OF VIRTUAL CIRCUITS |
| VCs PER SWITCH | XXX TERMINATING VIRTUAL CIRCUIT AND XXX TOTAL VIRTUAL CIRCUITS PER SWITCH | SWITCH NAME; SWITCH IP ADDRESS, NO. OF VCs |
| NSPS PER CARD | NUMBER OF NETWORK SERVICE PROVIDERS (NSP) LOGICAL PORTS PER CARD > X PER DEFINED CARD TYPES | SWITCH NAME; SWITCH IP ADDRESS, SLOT NO.; CARD TYPE; NO. NSP LPORTS ON THE CARD; DEFINED CARD TYPE EXAMPLES ARE DS-3, OC-3, OC-12, ETC. [THESE CARD TYPES ARE INDUSTRY STANDARD TERMS] |
| THREAD LIMITATIONS | DEFINED SERVICE CARDS SHOULD NOT BE USED IN A SHARED THREAD CONFIGURATION | SWITCH NAME; SWITCH IP ADDRESS, SLOT NO.; CARD TYPE; SEE ABOVE COMMENTS ON DEFINED SERVICE CARDS |
| LOGICAL PORTS ON DEFINED SERVICE CARD | NO MORE THAN X LOGICAL PORTS PROVISIONED ON A DEFINED SERVICE CARD | SWITCH NAME; SWITCH IP ADDRESS, SLOT NO.; CARD TYPE; NO. LOGICAL PORTS ON THE CARD; SEE ABOVE COMMENTS ON DEFINED SERVICE CARDS |

| LEVEL | EXCEPTION | ATTRIBUTE CRITERIA | DATA FIELDS |
|---|---|---|---|
| CARD | CARD | FCP ENABLED, ICR CONSTANT = X, FCP MANAGEMENT ENABLED | SWITCH NAME; SWITCH IP ADDR, SLOT NO.; CARD TYPE; FCP; ICR CONST; FCP MGT OF NON-VBR-RT VCs |
| LOGICAL PORT | RESOURCE MANAGEMENT (RM)-CELL GENERATION AND TERMINATION | GEN = NO LOOP, TERM = CCRM AND BCM; GEN = CCRM, TERM = CCRM; GEN = NO LOOP, TERM = CCRM | SWITCH NAME; SWITCH IP ADDR, LOGICAL PORT ID; RM-CELL GEN; RM-CELL TERM |
| | EFCI BIT CHECK | BOTH EFCI AND FCP ENABLED | SWITCH NAME; SWITCH IP ADDR, LPORT ID; LPORT TYPE; EFCI BIT CHECK |
| | Physical PORT BUFFER SIZE | XX CELL BUFFERS PER PPORT ON DEFINED SERVICE RATE | SWITCH NAME; SWITCH IP ADDR, LOGICAL PORT ID; LPORT TYPE; PORT BUFFER. |
| | EPD ENABLED | EPD DISABLED | SWITCH NAME; SWITCH IP ADDR, LOGICAL PORT ID; LPORT TYPE; EPD ENABLED |
| SWITCH | SWITCH | INCORRECT TUNING PARAMS | SWITCH NAME |
| TRUNK | VIRTUAL CIRCUITS MAPPED ACROSS TRUNK | XXX VCs PER DEFINED SERVICE RATE | TRUNK NAME; A-END ID; B-END ID; NO. VIRTUAL CIRCUITS MAPPED ACROSS TRUNK. |
| | QOS MATCH FOR BOTH ENDS | QOS PARAMS AT OPPOSITE ENDS OF TRUNK DO NOT MATCH | FIELDS SUCH AS SHOWN IN FIGURE 3A |
| | QOS PARAMS EXCEED THRESHOLDS | QOS PARAMS EXCEED THRESHOLDS | FIELDS SUCH AS SHOWN IN FIGURE 3A |
| | TRUNK IS DOWN | TRUNK OPERATION STATUS IS DOWN | A-END ID; B-END ID; TRUNK NAME; TRUNK OPERATIONAL STATUS |
| | TRUNK-TYPE IS MANAGEMENT-ONLY | TRUNK TYPE IS MANAGEMENT-ONLY | A-END ID; B-END ID; TRUNK NAME; TRUNK TRAFFIC TYPE |

SYSTEM AND METHOD FOR MANAGING NETWORK ELEMENTS IN AN ATM NETWORK

BACKGROUND

1. Field of the Invention

The present invention relates generally to broadband network management, and more particularly to management of asynchronous transfer mode (ATM) networks.

2. Background of the Invention

Traditionally, telecommunications service providers have offered basic services such as local and long distance exchange services for voice communications. More recently, with the explosive growth of the Internet and other data services, telecommunications service providers have expanded beyond basic telephone services to the provision of very high bandwidth network services. Examples of such newer network services include, for example, digital subscriber line (DSL), asymmetric digital subscriber line (ADSL), integrated services digital network (ISDN) digital subscriber line (IDSL), and the like. The underlying transmission facility supporting such high bandwidth networks may comprise an asynchronous transfer mode (ATM) network as shown in FIG. 1.

ATM network or "cloud" 10 in FIG. 1 comprises one or more ATM switches 11–15. The switches may be interconnected in any suitable manner to provide redundancy in the network and to ensure high speed transmission of network packets. ATM switches are well-known in the art and are available from numerous switch vendors, including, for example, Lucent, Cisco and Nortel.

ATM switch vendors generally provide off-the-shelf network management utilities that may be used to manage ATM network elements. A problem with conventional ATM network management tools, however, is the lack of adequate reporting capabilities providing information needed to properly manage a large-scale ATM network. For example, conventional ATM network management utilities do not provide trunk inventory reports, trunk utilization reports and exception reports.

Another problem with conventional ATM network management utilities is the lack of an activation utility to activate flow control and flow control attributes for eligible User Network Interfaces (UNIs).

SUMMARY OF THE INVENTION

The present invention provides a plurality of reporting tools that may be used to manage an ATM network. In a first embodiment, a trunk inventory report for managing trunks terminated on an ATM switch is provided. A header section of the trunk inventory report comprises at least one of a report title, a report date, a switch name for the ATM switch, a switch Internet Protocol (IP) address for the ATM switch, and a number of trunks terminated on the ATM switch. A body section of the trunk inventory includes a record for each trunk terminated on the ATM switch. The information in each record may be gathered from a switch management database and a network management information database. The trunk inventory report may be organized according to a pre-determined format to present the information in a usable format. Examples of data that may be gathered from the switch management database include a trunk name, data values associated with the trunk-end terminated on the ATM switch identified in the report header, and values associated with the trunk-end terminated on a second ATM switch.

In a second embodiment, a trunk utilization report for managing trunks terminated on an ATM switch is provided. A header section of the trunk utilization report comprises at least one of a report title, a report date, a switch name for the ATM switch, a switch IP address for the ATM switch, a period start date for the report and a period end date for the report. A body section of the trunk utilization report includes a record for each trunk terminated on the ATM switch. The information in each record may be gathered from a switch management database and a network management information database. Each record also includes a trunk utilization rate based on a cells incoming value and a cells outgoing value.

In a third embodiment, an exception report for identifying and managing exceptions in network elements associated in an ATM network is provided. A header section of the exception report includes at least one of an exception class, and an exception criteria. The exception class and exception criteria are selectable by a user of the report. A body section of the exception report includes a record for each exception associated with the selected exception class and exception criteria. The information in each record may be gathered from a switch management database and a network management information database. Examples of exception classes include a threshold class and an attribute class. Examples of exception criteria for threshold class exceptions include: virtual circuits per physical port, virtual circuits per card, virtual circuits per switch, network service providers per card, and thread limitations. Examples of exception criteria for attribute class exceptions include: card-level, Resource Management (RM)-cell generation and termination, Explicit Forward Congestion Indication bit check, physical port buffer size, Early Packet Discard (EPD) enabled (all of which are all well known industry terms describing ATM standard features), switch-level, virtual circuits mapped across a trunk, quality of service match for both ends, quality of service parameters exceeds thresholds, trunk is down, and trunk type is management-only.

In a fourth embodiment of the present invention, a Flow Control Processor (FCP) activation utility is provided. The utility preferably generates a report with the same type header descriptions provided above. The differences start after the switch name. At this point the report identifies the Cards, Physical Ports, Logical Ports, or Virtual Circuits that do not meet the defined standard, such that an exception report is provided. The exception class and exception criteria are selectable by a user of the report. A body section of the exception report includes a record for each exception associated with the selected exception class and exception criteria. The information in each record may be gathered from a switch management database and a network management information database. Examples of exception classes include a threshold class and an attribute class. Examples of exception criteria for threshold are as mentioned above the Cards, Physical Ports, Logical Ports, or Virtual Circuits. Flow Control attributes are that it is enabled at the card level. At the physical port there is a rate profile table that is modifiable. The logical level has attributes at relating to Cell Generation that are modifiable based on the classification of a trunk or UNI. A virtual circuit will have EPD enabled or not. The report is preferably designed to provide exceptions based on the level requested by the user.

BRIEF DESCRIPTION OF THE DRAWINGS

FIG. 3A is a table identifying exemplary fields associated with the A-end of trunks that may be reported in a trunk inventory report according to the present invention.

FIG. 3B is a table identifying exemplary generic fields that may be reported in a trunk inventory report according to the present invention.

FIG. 3C is a table identifying exemplary tuning parameters that may be reported in a trunk inventory report according to the present invention.

FIG. 6A is a table identifying exemplary threshold criteria and associated fields that may be reported in an exception report according to the present invention.

FIG. 6B is a table identifying exemplary attribute criteria and associated fields that may be reported in an exception report according to the present invention.

DETAILED DESCRIPTION OF THE INVENTION

The present invention provides a system and method for managing network elements in an ATM network by providing detailed reports for specific areas of concern to a network manager. The invention further provides an activation utility for setting flow control attributes. The various reports and utility are described in greater detail in the sections below.

Trunk Inventory Report

Figure 2:
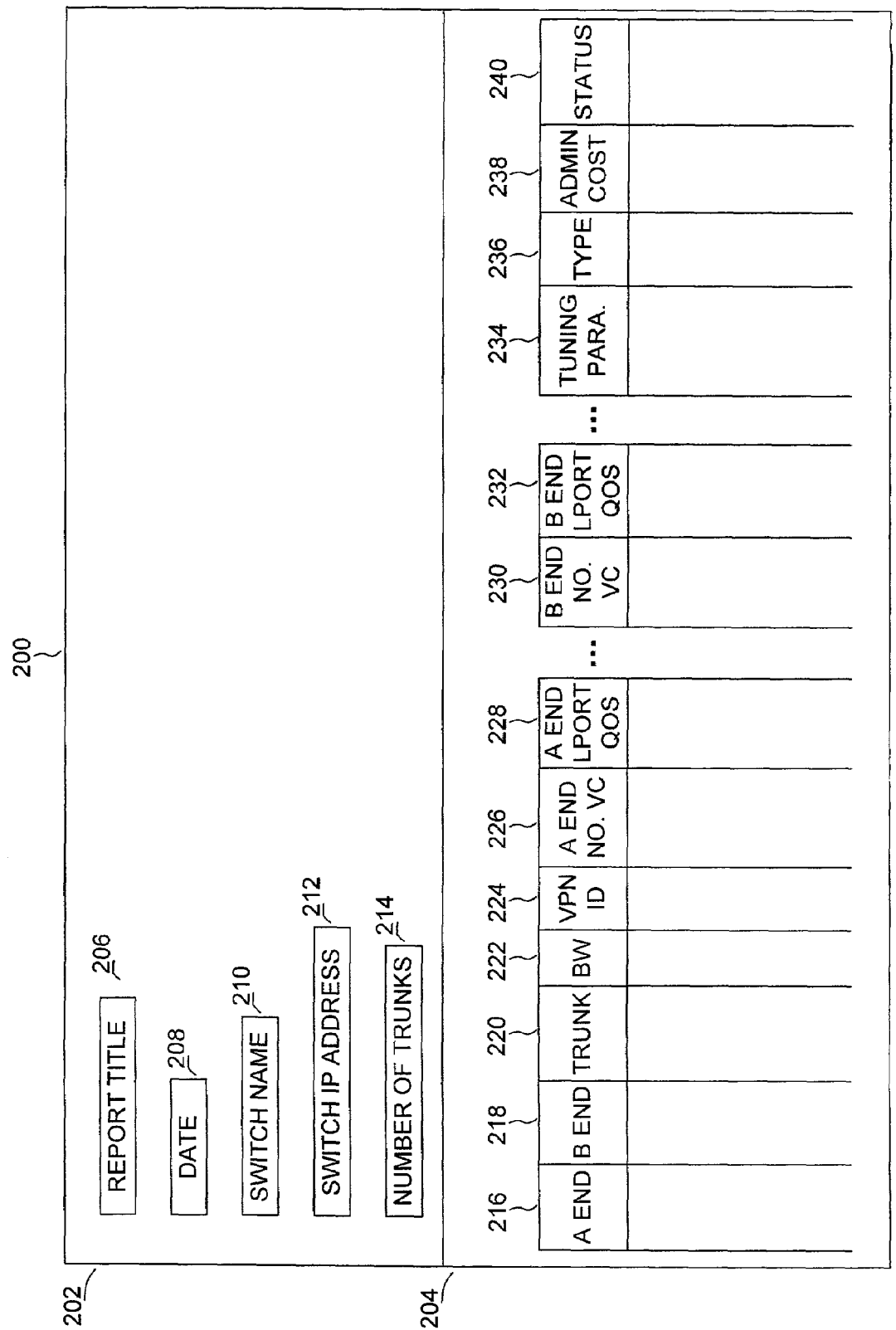
FIG. 2 is a schematic diagram of an exemplary trunk inventory report according to the present invention.

FIG. 2 shows an exemplary trunk inventory report 200 according to the present invention. Trunk inventory report 200 includes header section 202 and body section 204. Header section 202 provides the general information about the report. Each of the fields in header section 202 are optional fields that may be included to enhance the usability of the report. Report title field 206 may be used to identify the report. Date field 208 may be used to identify the date the report was generated. Switch name field 210 may be used to identify the switch associated with the trunk inventory report. Switch IP address field 212 may be used to identify the IP address of the switch. Number of trunks field 214 may be used to indicate the number of trunks reported.

Body section 204 includes a plurality of fields that may be used to provide detailed information about attributes of each trunk identified in the report. Some of the information used to populate the various fields in trunk inventory report 200 may be retrieved from vendor-specific network management databases. For example, if the ATM network switches are provided by Lucent, some of the data may be gathered from the NavisCore™ database via an application protocol interface (API) interface that will provide the proper naming conventions used to describe each trunk. This allows the report user to determine the offending trunk to execute the appropriate correction processes. Other data may be retrieved directly from the switch using the well-known simple network management protocol (SNMP). Those skilled in the art will appreciate that the present invention is applicable to ATM switches in a "vendor agnostic" way. Thus, while Navis refers to a specific network management system (NMS), or element management system (EMS) that is used by a particular vendor (Lucent) to manage its ATM switch, the present invention is generically applicable to ATM switches, ATM network elements, EMSs and NMSs generally.

Without the instant invention, an ATM is operated in the blind. Managers react to customer trouble reports rather than react to an information-based system that indicates the need to proactively respond to a threshold/exception report. The present invention is thus a process improvement initiative to manage the ATM business in a way that has a positive impact on customer service.

Referring again to FIG. 2, A-end identifier field 216 identifies the Logical Port on the local end. That is, the Logical Port on the same switch for which the report has been generated. B-end identifier field 218 identifies the Logical Port on the distant switch. Trunk name field 220 identifies the name of the trunk. Bandwidth field 222 is the bandwidth of the trunk. This value will typically be the maximum bandwidth of the two ends. That is, the bandwidth will be the larger of the bandwidths for the Logical Port of A-end and the Logical Port of the B-end, since the bandwidth at the Logical Port is symmetrical. VPN ID field 224 identifies the name of the virtual private network (VPN) to which the trunk belongs. The report also includes a plurality of fields for providing detailed information about each end of the trunk.

Fields 226 and 228 pertain to the A-end of the trunk and fields 230 and 232 pertain to the B-end. FIG. 2 shows just two of the many fields that may be included in the trunk inventory reports. Table 300 in FIG. 3A provides more detailed information about other such fields that may be included in the report. Table 300 only shows those fields associated with the A-end. It is to be understood that similar fields associated with the B-end may be included in the report. Table 302 in FIG. 3B shows other fields that may be included in the report.

Field 234 in FIG. 2 may be used to report various tuning parameters. Table 304 in FIG. 3C identifies some of the tuning parameters that may be included in a trunk inventory report according to the present invention.

Traffic type field 236 identifies the type of traffic allowed over an Interswitch Trunk. For example, traffic type 236 may indicate that all user data traffic is allowed, management traffic only is allowed, or management and user data traffic.

Administrative cost field 238 is used to identify the assigned costs for each trunk. This value may be used when routing circuits where trunks with the lowest costs are preferred.

Trunk status field 240 provides the current status of the trunk. Examples of status indicators include Administrative Status Up, Administrative Status Down, Operational Status Up, or Operational Status Down.

In a preferred embodiment, trunk inventory report 200 is generated by an application program running on a server identified as the location to house the utility. Trunk inventory report 200 is preferably generated in an ASCII format, and preferably has tab delimiters between fields.

Trunk Utilization Report

A trunk utilization report according to the present invention may be automatically generated by an application program. In a preferred embodiment, the application program may be run on a periodic basis to provide traffic statistics for the trunks in the network. The application may be scheduled to run using any application scheduling program. For example, on a UNIX-based system, the cron daemon may be used. In a Windows NT-based system, the Scheduled Task application of Windows may be used.

Trunk utilization is calculated based on traffic statistics over a defined period of time. The calculation is based on two sets of traffic data: a first set of data collected at the beginning of the period and a second set of traffic data collected at the end of the period. The application program preferably gathers traffic statistics data from each switch and saves the data in a text file. The application program then calculates a utilization rate for each trunk for the current period based on the most recent data collected and the data collected at the end of the last period. The application program then generates the trunk utilization report for the period.

Figure 4:
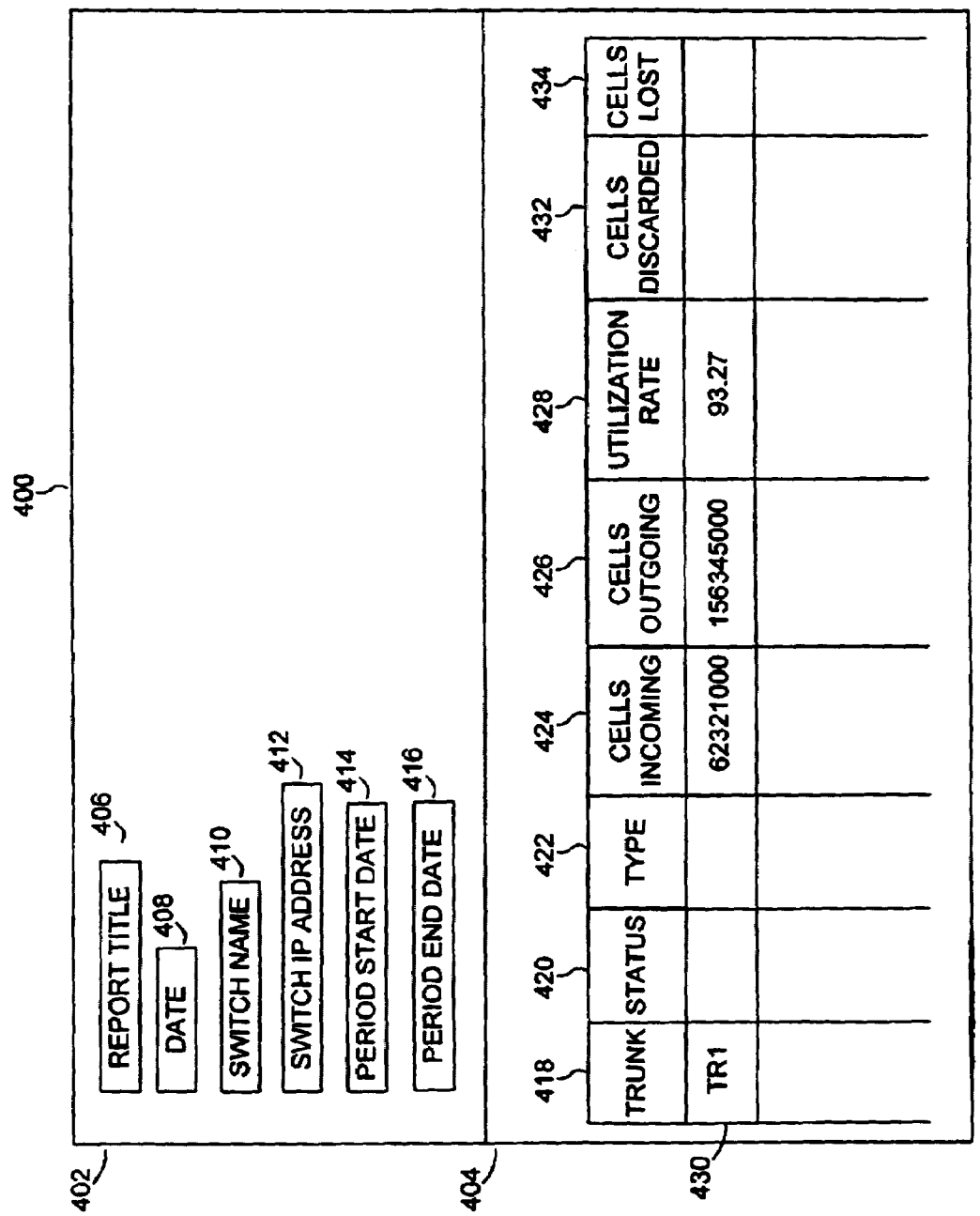
FIG. 4 is a schematic diagram of an exemplary trunk utilization report according to the present invention.

FIG. 4 shows an exemplary trunk utilization report 400 according to the present invention. Trunk utilization report 400 includes header section 402 and body section 404. Header section 402 provides the general information about the report. Each of the fields in header section 402 are optional fields that may be included to enhance the usability of the report. Report title field 406 may be used to identify the report. Date field 408 may be used to identify the date the report was generated. Switch name field 410 may be used to identify the switch associated with the trunk inventory report. Switch IP address field 412 may be used to identify the IP address of the switch. Period start date field 414 may be used to indicate the beginning of the period (i.e., the date the first set of data was generated) and period end date field 416 be used to indicate the end of the period (i.e., the date the second set of data was generated).

Report body 404 includes several fields of data that may be used in the trunk utilization report. Some of these fields are the same as those included in trunk inventory report 200. For example, trunk name field 418 identifies the name of the trunk. Trunk status field 420 provides the current status of the trunk, and, traffic type field 422 identifies the type of traffic allowed over an Interswitched Trunk.

Cells incoming field 424 indicates the number of cells incoming to Logical Port A (i.e., the A-end of the trunk) and the end of the period minus the number of cells incoming to Logical Port A at the beginning of the period. Cells outgoing field 426 indicates the number of cells outgoing from Logical Port A at the end of the period minus the number of cells outgoing from Logical Port A at the beginning of the period. Utilization rate field 428 is calculated by dividing the cells incoming minus cells outgoing by the duration divided by the trunk bandwidth. For example, if the trunk bandwidth for trunk TR1 shown in row 430 is 10,000 cells per minute and the duration of the period is one week, the utilization rate would be 93.27%. (62321000 cells−156345000 cells)/ 10080 minutes/10,000 cells/minute).

Cells discarded field 432 is determined from a data register in the switch. The process to calculate cells discarded is similar to the process described above, namely, a beginning number combined with an ending number to determine a difference. A similar calculation is performed for cells lost field 434.

The source of data for the information provided in trunk utilization report 400 is SNMP for each field, except for trunk name field 418 and (cells discarded field 432 and cells lost field 334) cells discarded and lost are reported by the switch to the application. Data for trunk name field 418 is gathered from, e.g., the NavisCore database and data for cells discarded field 432 and cells lost field 434 is gathered as described above.

Exception Report

An exception report according to the present invention may be used to report threshold exceptions and/or attribute exceptions. As used herein threshold exceptions are those items that exceed an established limit used to trigger relief processes eliminate the threshold exception. The threshold limits may be, for example, documented in a set of capacity engineering guidelines. This guidelines may be changed as needed to facilitate network architecture or design changes or response to capital (dollar) constraints. The threshold criteria is modifiable. As used herein, attribute exceptions are those items that do not meet the desired configuration profile established by documented engineering guidelines. These guidelines may also be changed as needed to facilitate network architecture or design changes. Preferably, the exception criteria is modifiable. The exceptions report may include exceptions examined at the switch, Physical Port, Logical Port, virtual circuit and trunk levels. All of the data reported in the exception report is gathered from the switch or an element management system database, such as NavisCore.

Figure 5:
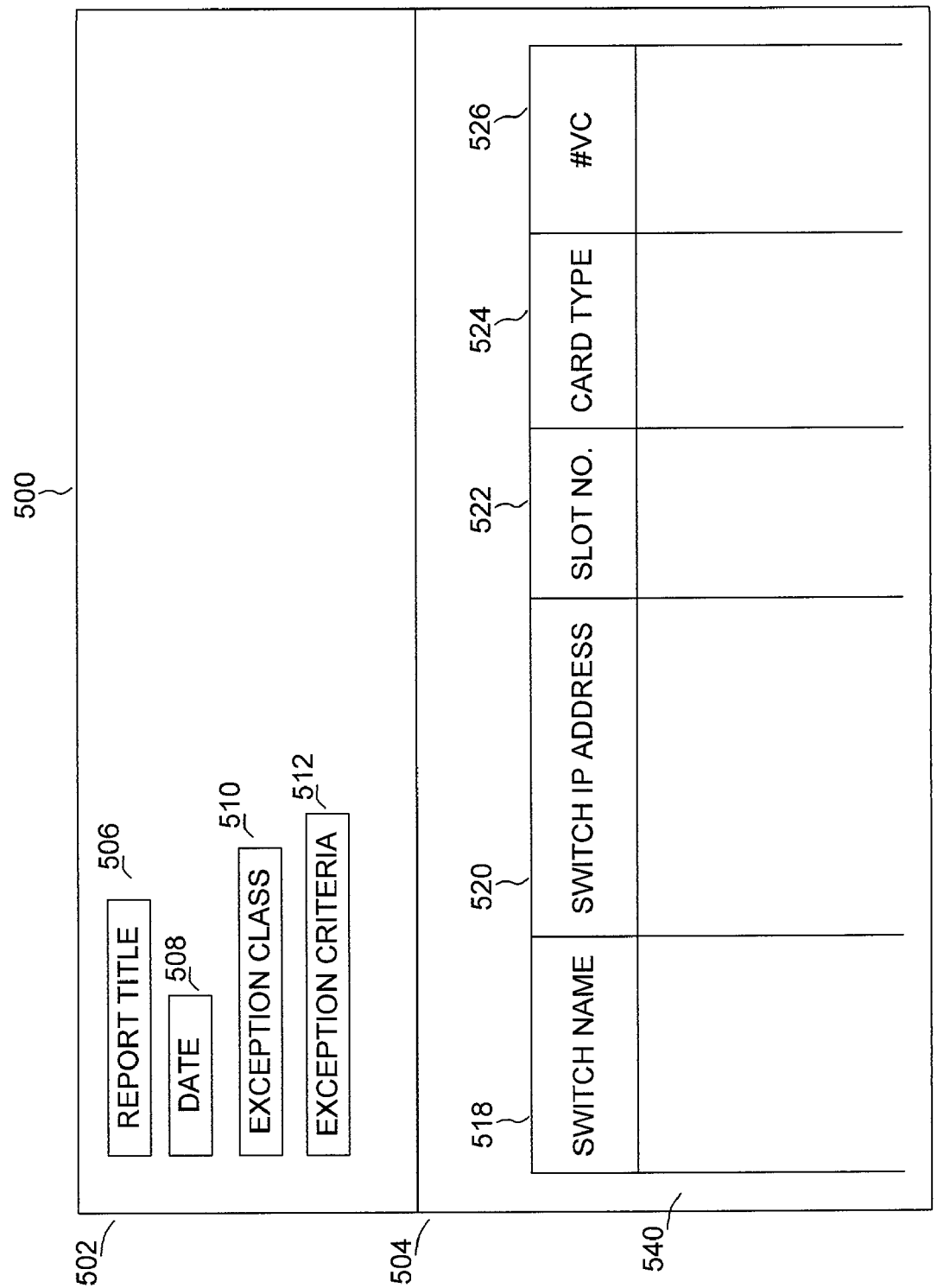
FIG. 5 is a schematic diagram of an exemplary exception report according to the present invention.

FIG. 5 shows an exemplary exception report 500 according to the present invention. Exception report 500 includes header section 502 and body section 504. Header section 502 provides the general information about the report. Each of the fields in header section 502 are optional fields that may be included to enhance the usability of the report. Report title field 506 may be used to identify the report. Date field 508 may be used identify the date the report was generated. Exception class field 510 may be used to identify the class of exceptions reported in the exception report. Exceptions may be classified either as "Threshold Exceptions" or "Attribute Exceptions." Exception criteria field 512 may be used to identify specific criteria reported in exception report 500. Exemplary criteria that may be reported in exception report 500 are identified in Tables 600 and 602 in FIGS. 6A and 6B, respectively. Table 600 identifies exemplary threshold criteria and Table 602 identifies exemplary attribute criteria. The expectation is that attributes in these tables are defined by an engineering design process that determines the criteria. This makes the criteria modifiable to match design standards.

Report body 504 includes several fields of data that may be used in the exception report and may vary depending on the exception being reported. Exemplary data fields associated with each exception criteria is provided in Tables 600 and 602. For example, if the exception criteria being reported is that the card has a FCP enabled and the virtual circuits (VCs) per card exceeds the pre-determined threshold amount, fields 518–426 may be used. In this case, switch name field 518 identifies the name of the switch for which an exception has been identified. Switch IP address field 520 may be used to provide the IP address of the switch named in field 518. Slot number field 522, card type field 524 and number of VCs field 526 provide additional information about the exception.

In addition to the criteria described above, other criteria may be defined by a network manager using the system and methods of the present invention. Preferably, such other criteria may be defined in a configuration file that may be edited by the user. Other criteria may include, for example, exceptions that should be reported but are not considered to be fatal exceptions. By including such non-critical exceptions in the exception report, the network manager may proactively manage the network to prevent fatal exceptions.

FCP Activation Utility

This utility may be used to activate the flow control for eligible UNIs, set the flow control attributes of the trunks to "safe" or "designed" values while the UNIs are being set up, and set the flow control attributes of the trunks to their "final" values once both (UNI) ends of the flow-control-eligible end-to-end path have their flow control attributes configured. Control is the control of traffic through the ATM network that ensures fairness in traffic balancing between virtual circuits and virtual paths in the ATM network. Control is desired since the ATM vendor community does not provide the necessary knowledge for appropriate and effective management. With improper controls the resulting service issues outweigh the benefit of flow control. It should be apparent that the present invention facilitates management and control of ATM traffic flow.

Figure 1:
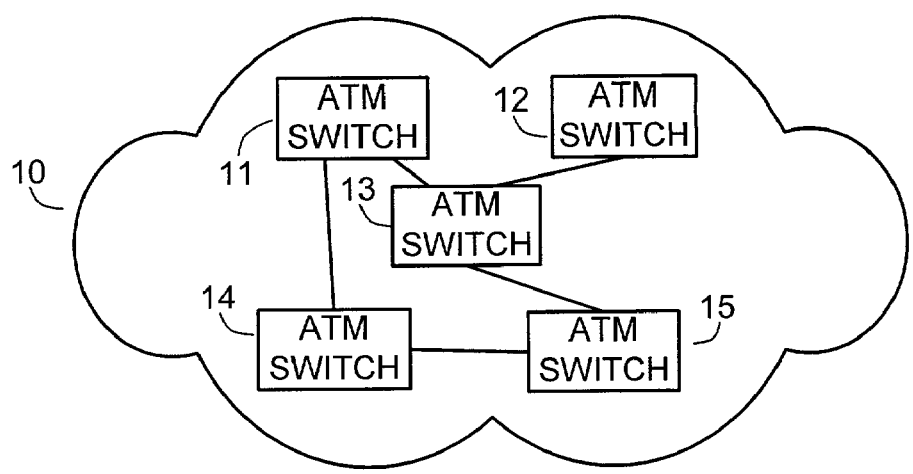
FIG. 1 is a schematic diagram showing a typical ATM network in which the present invention may be implemented.
Figure 7:
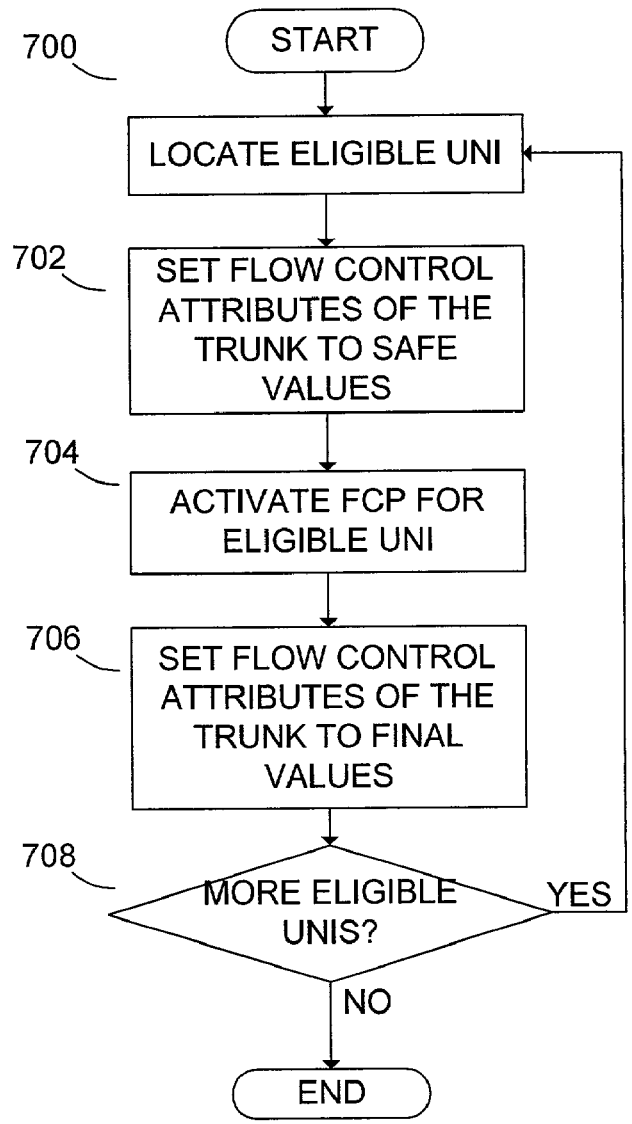
FIG. 7 is a flow diagram of exemplary steps for setting flow control attributes in an embodiment of the present invention.

In an embodiment of the present invention, the FCP Activation Utility may use an algorithm such as shown in the flow diagram in FIG. 7 to set the flow control attributes to match the designed or "safe" limits. In step 700, an eligible UNI is located. In this algorithm, an eligible UNI is any UNI connection on an ATM switch in which FCP needs to be enabled. In step 702, the flow control attributes of the trunks are set to design values. In step 704, the FCP for the eligible UNI is activated. For example, when the FCP is activated, the FCP may be initiated using the following settings: Initial Cell Rate (ICR) Constant=0; Rate Profiles tables are loaded; Resource Management (RM)-cell Interval=100 ms; Idle Virtual Circuit factor=8. In step 706, the flow control values are set to their final values. For example, the final values on the trunk for RM-cell settings may be: Generation=Call Control Resource Management (CCRM); and Termination=CCRM. For UNI, the final values may be: Generation=No Loop, and Termination=CCRM and Backward Control Management (BCM). More eligible UNIs are obtained through a loop back process indicated at step 708.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer system for generating a trunk inventory report for managing trunks terminated on an ATM switch, comprising:
    a server, in communication with the ATM switch and a network management information database, wherein the server is operative to execute an application program, and wherein the application program is operative to generate the trunk inventory report, the trunk inventory report comprising:
        a header section including at least one of a report title, a report date, a switch name for the ATM switch, a switch IP address for the ATM switch, and a number of trunks terminated on the ATM switch; and
        a body section including a plurality of fields for each trunk terminated on the ATM switch, wherein the plurality of fields includes a first plurality of data gathered from a switch management database and a second plurality of data gathered from the network management information database, wherein the first and second pluralities of data are organized according to a predetermined format and wherein the plurality of fields provide information about each of a first end and a second end of each trunk, wherein the plurality of fields further includes a bandwidth field for identifying the bandwidth of each trunk, wherein the bandwidth is the larger of a first bandwidth of the first end of each trunk and a second bandwidth of the second end of each trunk, wherein the plurality of fields further includes a traffic type field for identifying a type of traffic allowed over an interswitch trunk, wherein the traffic type indicates the allowance of at least one of user data and management traffic over the interswitch trunk, wherein the plurality of fields further includes an administrative cost field for identifying an assigned cost for each trunk,
    wherein the trunk inventory report generated by the computer system is utilized to route circuits over trunks having the lowest administrative costs, determine a trunk status, and enable a report user to execute correction processes for an offending trunk.

2. The computer system of claim 1, wherein the first plurality of data includes a trunk name, and the plurality of fields comprise data values associated with a trunk-end terminated on a second ATM switch.

3. A computer system for generating a trunk utilization report for managing trunks terminated on an ATM switch, comprising:
    an application program executing on the computer system, wherein the application program is operative to generate the trunk utilization report, the trunk utilization report comprising:
        a header section including at least one of a report title, a report date, a switch name for the ATM switch, a switch IP address for the ATM switch, a period start date for the report and a period end date for the report; and
        a body section including a record for each trunk terminated on the ATM switch, wherein each record includes a first plurality of data gathered from a switch management database, a second plurality of data gathered from a network management information database and a utilization rate, wherein the first and second pluralities of data are organized according to a predetermined format, wherein the second plurality of data includes a cells incoming value representing a number of cells incoming to a logical port at the end of each trunk at the end of a period minus a number of cells incoming to the logical port at the beginning of the period and a cells outgoing value representing a number of cells outgoing from the logical port at the end of the period minus a number of cells outgoing from the logical port at the beginning of the period, and wherein the utilization rate is based on the cells incoming and cells outgoing values, wherein the utilization rate for each trunk is calculated by dividing the cells incoming value minus the cells outgoing value by a duration of the period divided by a trunk bandwidth, wherein the trunk utilization report is periodically generated by the computer system to provide traffic statistics for each trunk terminated on the ATM switch.

* * * * *